United States Patent [19]

Sielaff

[11] Patent Number: 4,523,412
[45] Date of Patent: Jun. 18, 1985

[54] HANGER BRACKET AND METHOD OF USING SAME

[75] Inventor: Ulrich Sielaff, Madison, Wis.

[73] Assignee: United Steel Products Company, Montgomery, Minn.

[21] Appl. No.: 439,135

[22] Filed: Nov. 4, 1982

[51] Int. Cl.³ .............................................. E04B 1/32
[52] U.S. Cl. ....................................... 52/81; 52/210; 52/715; 403/232.1; 403/235; 403/161
[58] Field of Search ................. 52/81, 90, 715, 702, 52/210; 403/232.1, 235, 190, 161, 163

[56] References Cited

U.S. PATENT DOCUMENTS

| | | | |
|---|---|---|---|
| 862,498 | 8/1907 | Mohan | 52/702 |
| 1,657,243 | 1/1928 | Daniels | 403/190 |
| 2,477,163 | 7/1949 | Barnett | 403/190 |
| 2,611,160 | 9/1952 | Hanesse | 403/190 |
| 3,184,800 | 5/1965 | Nelson | 52/90 |
| 3,423,898 | 1/1969 | Tracy | 52/702 |
| 3,660,952 | 5/1972 | Wilson | 52/81 |
| 4,414,785 | 11/1983 | Howell | 403/232.1 |
| 4,423,977 | 1/1984 | Gilb | 52/702 |

Primary Examiner—Henry E. Raduazo
Attorney, Agent, or Firm—Dorsey & Whitney

[57] ABSTRACT

A hanger bracket for fastening a framing member to a strut of geodesic building structure, the struts of which define the planar faces of at least part of a regular geometric shape. The hanger bracket has a back and a top support member extending from the top end of the back and inclining toward the bottom end of the back at an angle to the back of substantially one-half the angle of intersection of the planar faces. A bottom support member is opposed to the top support member and extends parallel thereto from the bottom end of the back. The back may be fastened to a side surface of the strut with the top end extending away from the center of the geometric shape and the support members extending into the planar face of the geometric shape defined in part by the strut. The top and bottom support members are adapted to receive therebetween the end of the framing member and thus to hold the framing member parallel to the top and bottom support members and in the plane of the face regardless of the angle between the framing member and the longitudinal axis of the strut.

10 Claims, 5 Drawing Figures

HANGER BRACKET AND METHOD OF USING SAME

TECHNICAL FIELD

The present field invention relates to the construction of geodesic structures in general and, in particular, to the construction of icosahedron building structures.

BACKGROUND OF ART

Geodesic structures are popular and well known. Typically, such structures include a network of struts defining the straight-sided geometrical shapes that are joined together to form the overall structure. Geodesic structures having struts forming at least part of a regular icosahedron are particularly popular and are especially successful in constructing relatively small structures.

The struts of geodesic structures typically meet in complicated joints involving several struts meeting at angles that are determined by the particular geometrical shape defined by the entire network of struts. As a consequence, complicated mitering and fitting of the ends of such struts traditionally has been necessary. Such mitering and fitting requires considerable skill on the part of the workmen. Alternatively, factory preformed struts may be used in which the mitering and fitting is done in advance.

Various methods and devices have been developed to allow a comparatively unskilled workman to use conventional building materials, such as framing lumber of conventional dimensions, as the struts of geodesic structures. Examples include Birkemeier, et al., U.S. Pat. No. 3,635,509, and Woods, U.S. Pat. No. 3,486,278. A junction plate for use with conventional framing lumber is sold by East-West Design, Inc., Madison, Wis., and is adapted specifically for the construction of a geodesic structure in which the struts define part of a regular icosahedron.

Typically, the conventional framing lumber used as struts in geodesic domes is rectangular in cross section. Usually the struts are so joined that opposite sides of the rectangular framing lumber are held parallel to a line drawn from the center of the geometric shape defined by the network of struts through the center line of the framing member. Thus, the sides of adjacent struts are held at a predetermined angle to each other that reflects the fact that the ends of the struts converge on each other and the opposed sides of two adjacent struts tip away from each other.

It is usually necessary to include in a geodesic structure framing members additional to those constituting the struts that define the geometrical shape of the dome. Such framing members are necessary at any time that a face of the geodesic structure must be subdivided to provide for a window, door, or similar feature. Furthermore, it is sometimes necessary to subdivide the faces of a geodesic dome in order to accommodate sheeting material that is available in pieces too small to cover each face in one unbroken piece. Because of the complicated angles involved, it typically requires a workman of great skill to accomplish the mitering necessary to fit the ends of such a subdividing framing member against the tipped and spreading sides of the struts. Thus, while means have been provided to allow relatively unskilled workmen to construct the basic framework of a geodesic dome without the need to accomplish complicated mitering, great skill still is needed in completing the structure if it is necessary to miter the ends of framing members to subdivide the faces of the structure. This is especially the case because the angles that such framing members make with the struts also may vary from application to application. Thus, while a door frame generally will meet at least one strut at right angles thereto, the framing members defining windows or otherwise subdividing a triangular face of the structure will meet the struts at unpredictable angles.

Various braces and brackets have been developed for attaching one framing member or the like to another in a number of contexts. Examples include Wack, U.S. Pat. No. 4,280,686, Belt, U.S. Pat. No. 4,149,346, Tracy, U.S. Pat. No. 3,596,941, and Tracy, U.S. Pat. No. 3,481,635. However none of the braces or brackets disclosed in the cited patents are adapted to be attached to the strut of a regular icosahedron geodesic structure to receive and hold the unmitered end of a framing member that extends therefrom to another, adjacent strut.

BRIEF SUMMARY OF THE INVENTION

The present invention is summarized in that a hanger bracket for fastening a framing member to a strut of a geodesic building structure the struts of which define planar faces of at least part of a regular geometric shape having more than six such faces, the planes of which intersect the planes of adjacent faces, the strut having a planar mounting surface presented generally toward an adjacent strut and extending lengthwise along the strut and generally parallel to a line drawn from the center of the geometric shape through the longitudinal axis of the strut includes, a back having top and bottom ends, a top support member extending from the top end of the back and inclining toward the bottom end at an angle to the back of substantially one-half the angle of intersection of the planes of adjacent faces, and a bottom support member opposed to the top support member and extending parallel thereto from the bottom end of the back. The back is adapted to be fastened to the planar mounting surface of the strut with the top end extending generally away from the center of the geometric shape and with the support members extending into a planar face defined in part by the strut. The top and bottom support members are adapted to receive therebetween the end of the framing member and thus to hold the framing member parallel to the top and bottom support members and in the plane of the face regardless of the angle between the longitudinal axes of the framing member and the strut.

The method of the invention for fastening a framing member to a strut of a geodesic building structure of the sort referred to above includes the steps of fastening to the planar mounting surface of the strut the back of a hanger bracket having the structure described above, the hanger bracket being so fastened that the top end of the back thereof extends generally away from the center of the geometric shape; inserting the end of the framing member between the top and bottom support members of the hanger bracket parallel thereto and with its longitudinal axis oriented at a selected angle to the longitudinal axis of the strut; and fastening the top and bottom support members to the framing member, whereupon the framing member may be fastened to the strut and held within the plane of the planar face of the geometric shape defined in part by the strut, regardless of the angle between the longitudinal axes framing member and the strut.

The primary object of the invention is to provide for fastening a framing member to a strut of a geodesic building structure in such a way that the framing member lies within the plane of a face of the structure.

A second object of the invention is to provide for so fastening the framing member securely and reliably in the plane of the face without the need to specially miter the end of the framing member.

Another object of the invention is to so provide for such fastening that it can be accomplished by a workman of modest experience and skill using no more than simple tools.

A further object of the invention is to provide as a means for so fastening the framing member a hanger bracket that may be manufactured from a single piece of sheet metal by simple bending and punching steps.

Yet another object of the invention is to provide a hanger bracket that can be fastened to such a strut and thereafter receive the end of a framing member to be held by the hanger bracket without mitering or other special cutting or forming with the longitudinal axes of the strut and framing member oriented at any desired angle, with the framing member nevertheless held within the plane of the face defined in part by the strut.

A further object of the invention is to provide a method of fastening a framing member to a strut of the sort described above that allows an unskilled workman to swiftly, accurately, and strongly fasten the framing member to the strut.

Other objects, features, and advantages of the invention will be apparent from the following detailed description taken in conjunction with the accompanying drawings showing a preferred embodiment of a hanger bracket for fastening a framing member to a strut of an icosahedron building structure.

DETAILED DESCRIPTION OF THE PREFERRED EMBODIMENT

Figure 1:
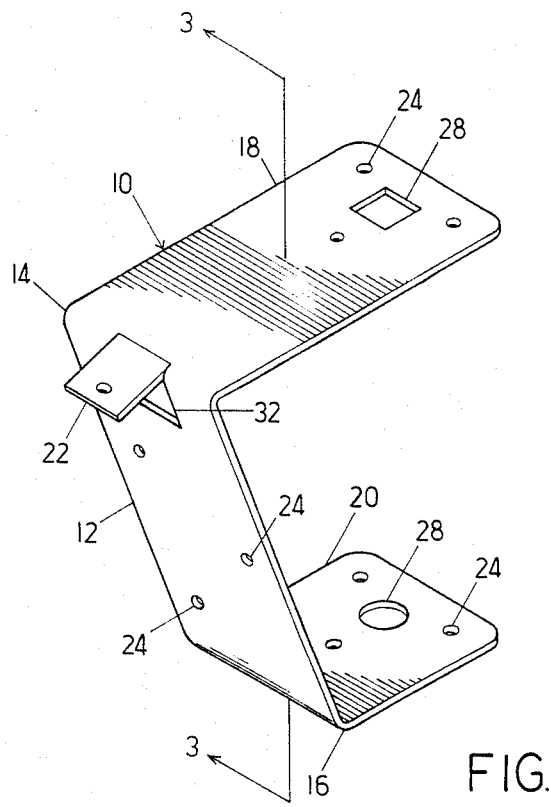
FIG. 1 is a perspective isometric view of a hanger bracket constructed in accord with the present invention.
Figure 2:
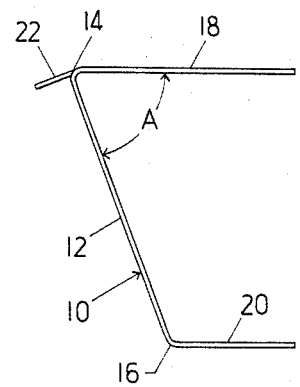
FIG. 2 is a side elevation view in reduced scale of the hanger bracket shown in FIG. 1.
Figure 3:
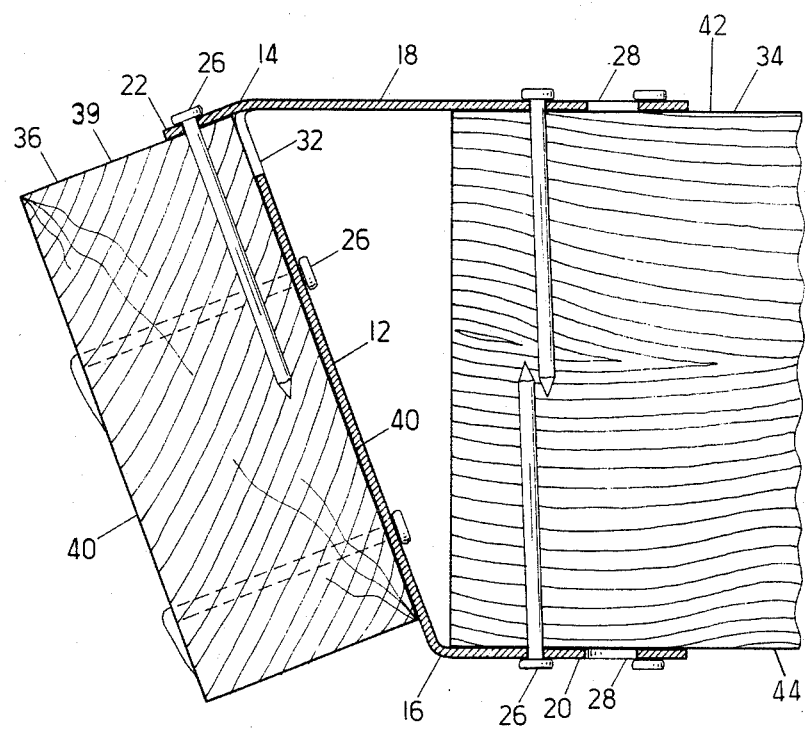
FIG. 3 is a cross sectional view of the hanger bracket of FIG. 1 taken along section lines 3—3, the hanger bracket shown attached to a strut and framing member.

Referring more particularly to the drawings, wherein like numbers refer to like parts, FIGS. 1 and 2 show a hanger bracket made in accord with the present invention, indicated at 10. The hanger bracket has a back 12 having a top end 14 and a bottom end 16. A top support member 18 extends from the top end 14 of the back 12. The top support member 18 inclines toward the bottom end 16 at an angle "A" to the back, as is indicated in FIG. 2. The angle A will be referred to herein as the "specified angle", between the top support member 18 and the back 12. A bottom support member 20 extends parallel and in opposed relation to the top support member 18, extending from the bottom end 16 of the back 12.

Preferably a locater tab 22 extends from the top end 14 of the back 12 generally away from the top support member 18 and substantially at a right angle to the back, as is best shown in FIG. 2.

The back 12, top support member 18, bottom support member 20, and locater tab 22 of the preferred embodiment have fastener apertures 24 extending therethrough. Preferably the fastener apertures 24 include openings sufficiently large to allow nails 26 of a selected size to pass therethrough. The top and bottom support members 18, 20 include at least one set of bolt apertures 28 adapted to receive a bolt 30 extending through and between the top and bottom support members, generally at a right angle thereto. Preferably, the bolt aperture 28 of the top support member 18 is square in shape to engage the head of a carriage bolt and prevent it from turning as the nut is tightened on the bolt 30.

It will be apparent that the hanger bracket 10 disclosed above may be conveniently manufactured from a single piece of sheet material. With the piece of sheet metal cut to the desired size, the fastener and bolt apertures 24, 28 may be punched therein by conventional and well known methods. The top and bottom support members 18, 20 may then be bent relative to the back 12 to the specified angle, again by conventional and well known means. At an appropriate point in the manufacturing process, the locator tab 22 may be punched from the piece of sheet metal, with three sides of the tab cut and the fourth left continuous with the remaining parts of the piece of sheet metal. As a result, a locator tab void 32 is formed in the piece of sheet metal, being the gap left in the sheet metal once the locator tab 22 has been punched therefrom. Preferably, the locator tab void 32 is centrally located and extends from the top end 14 of the back 12 downwardly, adjacent to and beneath the locator tab 22. Alternatively, the locator tab void 32 may be located in the top support member 18 and extend centrally away from the top end 14 of the back 12. Alternative embodiments of the locator tab 22 could as well be located at either side margin of the back 12 or top support member 18, but the arrangement of the preferred embodiment offers the advantage of the efficient use of sheet metal stock in that a rectangular piece of sheet metal may be used to manufacture the hanger bracket 10. Many such pieces may be cut from a larger, stock piece with no waste metal remaining.

The hanger bracket 10 is adapted to be used to fasten the end of a framing member 34 to a strut 36 of a geodesic structure. In particular, the hanger bracket 10 is adapted to be used in a geodesic structure having struts 36 that define the edges of at least a part of a regular geometric shape having more than six planar faces, such as the icosahedron shown in FIG. 5 at 38. Hereinafter the structure shown shall be referred to simply as an "icosahedron structure and shall be used as a typical example of a geodesic structure."

The struts 36 of an icosahedron structure 38 define equilateral triangular faces. When the struts 36 are made of conventional lumber having a rectangular cross section, such as 2×4s, 2×6s, and the like, it is convenient that the struts 36 be so joined that the two wider sides of the lumber extend generally parallel to a line drawn from the center of the icosahedron outwardly through the longitudinal axis of the strut, with one of narrower sides facing outwardly, away from the center of the icosahedron, as is indicated at 39. In such a case, one side of each strut 36 generally faces the remaining two struts that join with the first strut to define a triangular face of the icosahedron. Such side surfaces relative to a given triangular face shall be referred to herein as planar mounting surfaces 40. The angle between planar mounting surfaces 40 and the plane of the triangular face defined by three adjacent struts 36 is 69 degrees when the struts form part of a regular icosahedron, the angle between adjacent faces being twice 69° or 138°. The angle A between the top support member 18 and the back 12 referred to above is selected to be substantially one-half the angle of intersection of the triangular faces of the regular icosahedron shape upon which the icosahedron building structure is based. Thus, the specified angle A is substantially one half of 138° or 69°.

In its use, the back 12 of the hanger bracket 10 is held against the planar mounting surface 40 of a strut 36. The back 12 is slid down the planar mounting surface 40 until the locator tab 22 contacts the outwardly facing side 39 of the strut 36. Because the locator tab 22 and back 12 extend at right angles to each other, both may be held flatly against the parts of the strut 36 with which they are in contact. Nails 26 may then be driven through the fastener apertures 24 of the locator tab 22 and back 12, securing the hanger bracket 10 to the strut 36. It will be noted that the angle between the planar mounting surfaces 40 and the plane of the triangular face defined by the associated struts 36 is the same as the angle between the back 12 and the top and bottom support members 18, 20. Consequently, with the hanger bracket 10 secured in the manner disclosed, the support members extend into the plane of the triangular face and are parallel thereto.

Next the end of the framing member 34 may be inserted between the top and bottom support members 18, 20. The framing member 34 has an outwardly facing side 42 and an inwardly facing side 44. The distance between the top support member 18 and bottom support member 20 is selected to be substantially the same as the distance between the outwardly facing and inwardly facing sides 42, 44 of the framing member 34 so that the framing member may be snugly received therebetween and held parallel thereto. Because of the angular relationships discussed above, the framing member 34 so inserted between and held parallel to the support members 18, 20 extends within the plane of the triangular face. This remains true without regard to the angle at which the longitudinal axis of the framing member 34 is set relative to the longitudinal axis of the strut 36.

Figure 4:
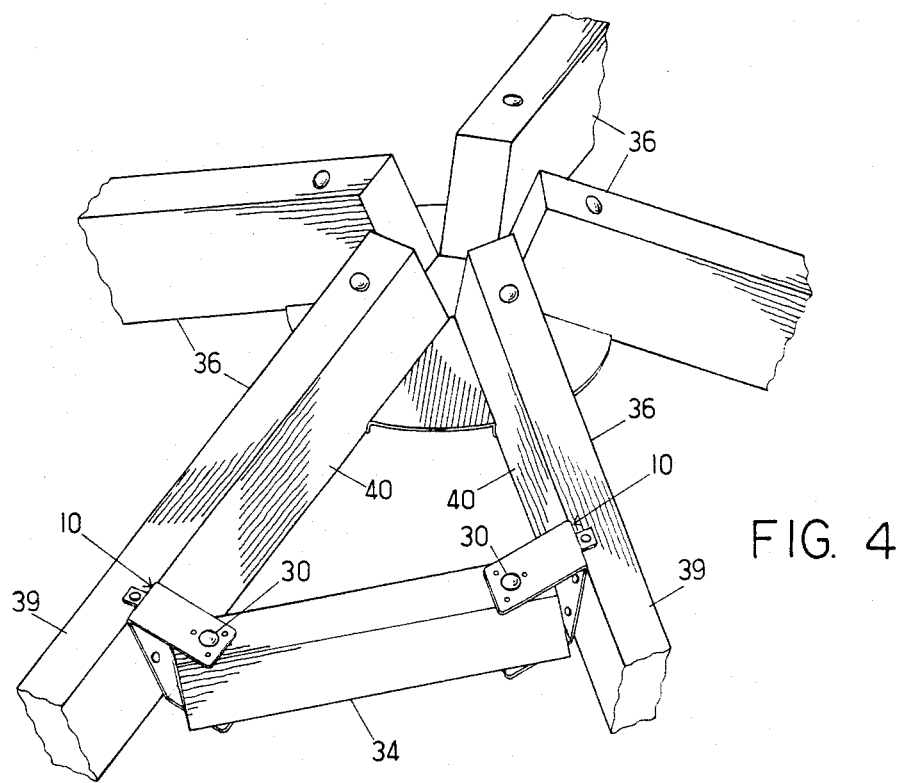
FIG. 4 is a broken away portion of the framework of an icosahedron building structure showing parts of five struts thereof and a framing member fastened between two of the struts by means of two of the hanger brackets shown in FIG. 1.

With the framing member 34 placed between the top and bottom support members 18, 20 with its longitudinal axis directed at the desired angle to the longitudinal axis of the strut 36 to which the hanger bracket 10 is fastened, nails 26 may be driven through the fastener apertures 24 of the top and bottom support members to secure the framing member in place. Alternatively, a hole may be drilled between the outwardly facing and inwardly facing sides 42, 44 of the framing member 34 at a right angle to the longitudinal axis of the framing member to receive a bolt 30 passed through the bolt apertures 28, as is illustrated in FIG. 4. The hole drilled through the framing member 34 must be no more distant from the end thereof than is the bolt aperture 28 of the bottom support member 20 from the bottom end 16 of the back 12.

Figure 5:
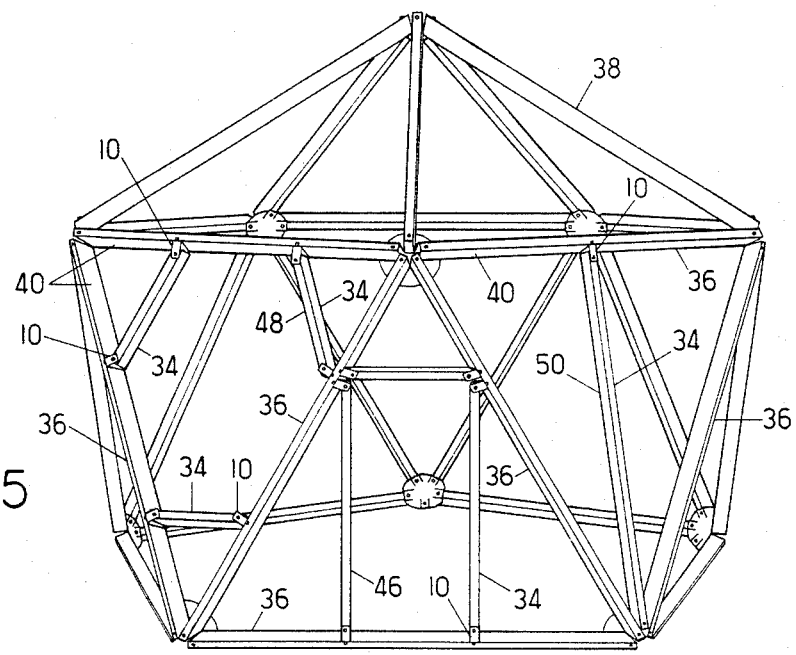
FIG. 5 is a perspective view of the struts of an icosahedron building structure to which a number of different framing members have been attached by means of hanger brackets of the sort shown in FIG. 1.

It will be appreciated that a hanger bracket 10 may be used at either end of a framing member 34 extending between any two struts 36 that, together with a third strut, define a triangular face of a regular icosahedron. The framing member 34 will be held within the plane of the triangular face of the icosahedron without regard to the angles between the longitudinal axes of the framing member and the two struts 36. Thus, door frames such as that shown in FIG. 5 at 46 may be fashioned as easily as irregular openings, such as that shown in FIG. 5 at 48. Likewise, with one end of a framing member 34 attached to two struts 36 at their point of intersection, the other end of the framing member may extend to the third strut 36 to bisect the triangular face defined by the three struts, as is shown in FIG. 5 by the bisecting framing member 50.

Although an icosahedron building structure has been discussed above as typical of geodesic structures the struts of which define planar faces of at least part of a regular geometric shape having more than six such faces, and the hanger bracket 10 of the invention has been described in typical form with respect thereto, hanger brackets made in accord with the invention may be adapted for use with any such regular geodesic structure. The planes defined by the faces of such structures intersect at an angle that is specific to the geometric shape involed. The 138° angle of intersection of the faces of a regular icosahedron is an example of such angles. The specified angle "A" disclosed above between the top support member 18 and the back 12 must be selected to be substantially one half of that angle of intersection.

Although the preferred embodiment of the hanger bracket 10 is made of sheet metal punched and bent in the manner disclosed, clearly a hanger bracket could be made of any suitably rigid and strong material fashioned by any conventional means. The locator tab 22 is a desirable convenience. However, a hanger bracket 10 not having a locator tab 22 would be within the scope and spirit of the invention and would fulfill the central purposes of the invention. The fastener apertures 24 may be adapted to receive screws as well as the nails and bolts shown, as well as any other desired fastener or combination of fasteners. The locator tab 22 may be entirely without fastener apertures 24, as may the top and bottom support members 18, 20 when bolt apertures 28 are used.

The method of the invention for fastening a framing member 34 to a strut 36 of a geodesic building structure, such as the icosahedron structure 38 described above, shall be described again using the icosahedron structure as typical. The method includes the steps of fastening to a planar mounting surface 40 of the strut the back 12 of a hanger bracket 10 having the features disclosed above, the hanger bracket being so fastened that the top end 14 of the back extends generally away from the center of the icosahedron with the back oriented at a right angle to the longitudinal axis of the strut. The end of the framing member 34 is then inserted between the top and bottom support members 18, 20, extending parallel thereto with its longitudinal axis oriented at a desired angle to that of the strut. The top and bottom support members 18, 20 are then fastened to the framing member 34, whereupon the framing member may be fastened to the strut 36 and held within the plane of the triangular face of the icosahedron defined in part by the strut, regardless of the angle between the longitudinal axes of framing member and the strut.

When the hanger bracket 10 includes a locater tab 22 of the sort disclosed above, the step of fastening the hanger bracket to the strut 36 includes resting the locator tab on the outwardly facing side 39 of the strut to position the top end 14 of the back 12 generally at the level of the outwardly facing side. Preferably, when the hanger bracket 10 is supplied with bolt apertures 28, as disclosed above, before the step of inserting the end of the framing member 34 between the support members 18, 20, a hole is drilled through the framing member between its outwardly and inwardly facing sides 42, 44 at a right angle to the longitudinal axis thereof and not further from the end thereof than the distance between the bolt aperture of the bottom support member 20 and the back 12. Thereupon, the step of fastening the top and bottom support members 18, 20 to the framing member 34 includes inserting a bolt 30 through the bolt apertures 28 and the hole drilled in the framing member. Alternatively, when the top and bottom support members 18, 20 have fastener apertures 24 adapted to receive nails 26, the step of fastening the top and bottom support members to the framing member 34 may include driving nails through the fastener apertures thereof and into the framing member.

It will be appreciated that no mitering of the end of the framing member 34 is necessary in any of the steps described above. As long as the framing member 34 has been cut off to form a generally straight end approximately square with the sides of the framing member, the hanger bracket 10 of the invention may be used in accord with the method disclosed to achieve the indicated result. The nailing, drilling, and fastening with bolts described are elementary skills that even a relatively unskilled workman has or may easily acquire. Thus, what is otherwise a difficult task requiring great skill may be achieved by an ordinary workman quickly, easily, and with predictably good results.

The present invention is not limited to the particular angles, construction, and arrangement of parts illustrated and disclosed nor to the particular steps disclosed herein. Instead, it embraces all such modified forms thereof as come within the scope of the following claims.

What is claimed is:

1. A hanger bracket for fastening a framing member to a strut of a geodesic building structure the struts of which define planar faces of at least part of a regular geometric shape having more than six such faces, the planes of which intersect the planes of adjacent faces, the strut having a planar mounting surface presented generally toward an adjacent strut and extending lengthwise along the strut and generally parallel to a line drawn from the center of the geometric shape through the longitudinal axis of the strut, the hanger bracket comprising:
   (a) a back having top and bottom ends;
   (b) a top support member extending from the top end of the back and inclining toward the bottom end at an angle to the back of substantially one-half the angle of intersection of the planes of the adjacent faces; and
   (c) a bottom support member opposed to the top support member and extending parallel thereto from the bottom end of the back, the back being adapted to be fastened flat against the planar mounting surface of the strut with the top end extending generally away from the center of the geometric shape and with the support members extending into a planar face defined in part by the strut, the top and bottom support members being free of any structure extending therefrom and toward the other, thus permitting said top and bottom support members to receive therebetween the end of the framing member which is both sloped and skewed relative to said strut and to hold the framing member parallel to the top and bottom support members and in the plane of the face regardless of the angle between the longitudinal axes of the framing member and the strut.

2. The hanger bracket specified in claim 1 wherein the geodesic building structure is an icosahedron building structure the planar faces of which are triangular faces having an angle of intersection of substantially 138°, the top support member therefore extending from the top end of the back and inclining toward the bottom end at an angle substantially of 69° to the back.

3. The hanger bracket specified in claim 1 wherein the strut has an outwardly facing side presented generally away from the center of the geometric shape and wherein said bracket includes a locator tab extending from the top end of the back at a right angle thereto and away from the top support member, the locator tab being adapted to rest on the outwardly facing side of the strut.

4. The hanger bracket specified in claim 1 wherein the back and the top and bottom support members have fastener apertures through which selected fasteners may extend for fastening the back to the strut and the top and bottom support members to the framing member.

5. The hanger bracket specified in claim 1 wherein the top and bottom support members have at least one set of bolt apertures adapted to receive a bolt extending between the top and bottom support members at a right angle thereto and through the framing member.

6. The hanger bracket specified in claim 3 wherein the back has a locator tab void extending from the top end of the back downwardly adjacent to and beneath the locator tab, whereby the hanger bracket may be manufactured from a single piece of sheet metal, with the top and bottom support members being bent relative to the back to the specified angle and the locator tab being punched from the back with the effect of producing the locator tab void.

7. The hanger bracket specified in claim 3 wherein the top support member has a locator tab void extending away from the top end of the back adjacent to the locator tab, whereby the hanger bracket may be manufactured from a single piece of sheet metal, with the top and bottom support members being bent relative to the back to the specified angle and the locator tab being punched from the top support member and bent to the specified angle relative to the back with the effect of producing the locator tab void.

8. The hanger bracket of claim 1 wherein said back has a longitudinal axis and said top and bottom support members extend from said back along top and bottom bend lines, respectively, said top and bottom bend lines being perpendicular to the longitudinal axis of said back.

9. The hanger bracket of claim 1 wherein said back is free of any structure extending therefrom except for said top and bottom support members.

10. The hanger bracket of claim 3 wherein said back is free of any structure extending therefrom except for said top and bottom support members and said locator tab.

* * * * *